May 2, 1944. A. H. THOMPSON 2,347,853
MANUFACTURE OF SELF-LOCKING NUTS
Original Filed Aug. 12, 1942
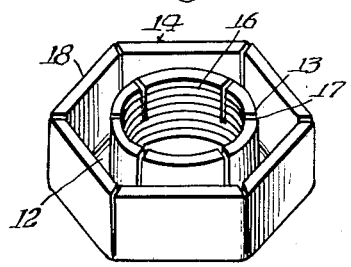
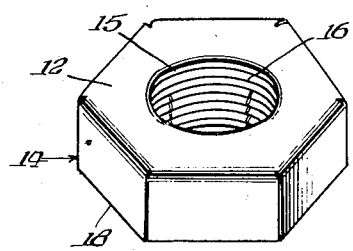
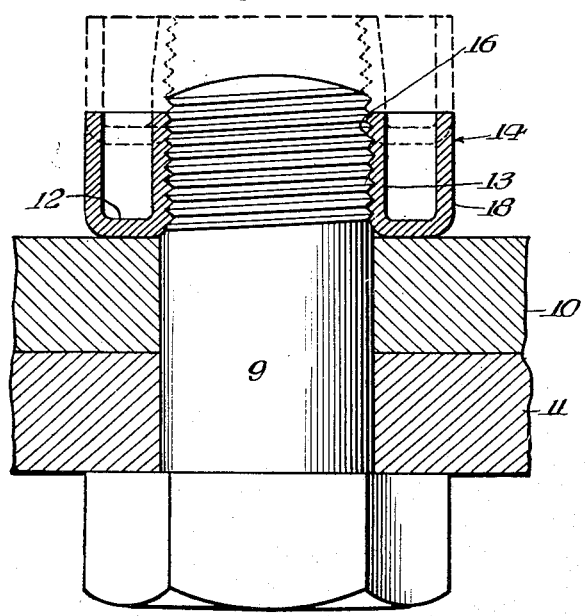
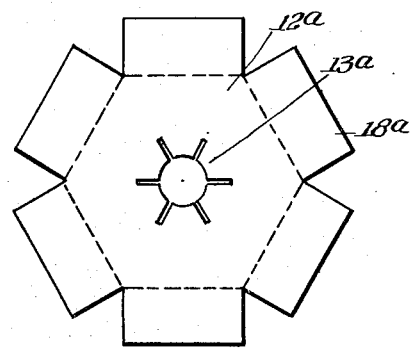
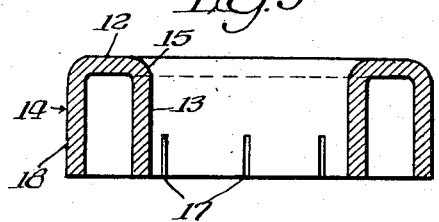
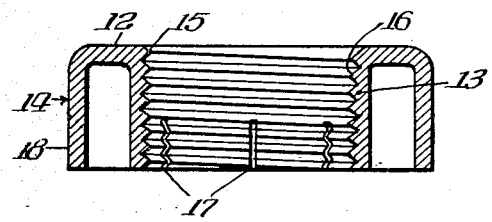
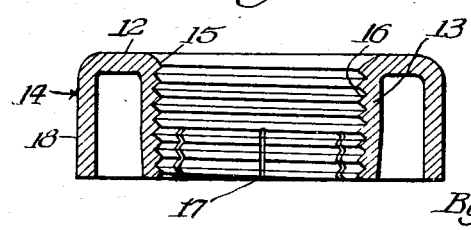
Inventor:
Arthur H. Thompson
By Fred Gerlach
Atty.

Patented May 2, 1944

2,347,853

UNITED STATES PATENT OFFICE 2,347,853

MANUFACTURE OF SELF-LOCKING NUTS

Arthur H. Thompson, Chicago, Ill., assignor to Thompson-Bremer & Co., Chicago, Ill., a corporation of Illinois Original application August 12, 1942, Serial No. 454,525. Divided and this application April 14, 1943, Serial No. 482,951

1 Claim. (Cl. 10—86)

The present invention relates to the manufacture of self-locking nuts and one object thereof is the provision of a simple or novel method of manufacturing or fabricating a self-locking nut of the type that is adapted to be mounted on an externally threaded element projecting through a work piece, is formed from a one-piece blank of spring metal, and comprises (1) a body which is adapted to engage the work and has an aperture in the central portion thereof for receiving the threaded element, (2) an internally threaded sleeve which is joined to, and extends in one direction from, the aperture defining portion of the body, is adapted when the nut is mounted on the externally threaded element to surround and interfit with the thread of the element and extend away from the work piece, and has longitudinally extending, laterally spaced notches in its outer or free end and the portions thereof between such notches bent inwards so that they grip the element with spring pressure, and (3) a flange structure which is connected to the outer marginal portion of the body, extends in the same direction as the sleeve, and forms a side wall around and in spaced relation with the sleeve.

One object of the invention is to provide a method of manufacturing a self-locking nut of the aforementioned type which involves or comprises the following steps: first stamping from spring metal stock a flat blank consisting of an intermediate body forming portion, an inner centrally apertured sleeve forming portion with notches leading radially outwards from the aperture, and an outer flange forming portion, then deforming the blank by extruding the inner portion thereof in one direction to form a central substantially cylindrical sleeve of greater height than the length of the notches and upsetting the outer portion in the same direction to form a substantially continuous flange structure around and in spaced relation with the sleeve, then tapping the inner periphery of the sleeve from end to end to form an internal screw thread; and finally completing the nut by bending inwards the portions of the outer or free end of the sleeve that are between the notches.

A further object of the invention is the provision of a nut manufacturing method which may be carried out expeditiously and at an extremely low cost.

Other objects of the invention and the various advantages and characteristics of the present method of making a self-locking nut will be apparent from a consideration of the following detailed description.

The invention consists in the method which is hereinafter set forth in detail and is more particularly defined by the claim at the conclusion hereof.

In the drawing which accompanies and forms a part of the specification or disclosure and in which like numerals of reference denote corresponding parts throughout the several views:

Figure 1 is a top perspective view of a self-locking nut that is made in accordance with the improved method;

Figure 2 is a bottom perspective view of the nut;

Figure 3 is a section showing the nut mounted in place on the threaded shank of a bolt;

Figure 4 is a plan view of the spring steel blank from which the nut is made;

Fig. 5 is a section showing the nut after shaping or processing the blank to form the body, sleeve and flange structure;

Figure 6 is a section showing the nut after tapping of the inner periphery of the sleeve to form the internal screw thread; and Figure 7 is a section showing the nut in its finished form, i. e., after the portions of the sleeve that are between the notches are bent or deflected inwards in order yieldingly to grip the threaded element to which the nut is applied.

The improved method is for the express purpose of producing a nut like that shown in the drawing. Such nut has self-locking characteristics and is shown in Figure 3 in connection with a bolt 9 and a pair of abutting or superposed plates 10 and 11. The bolt exemplifies one type or form of externally threaded element on which the nut may be mounted. It is of conventional design and comprises an externally threaded shank and a polygonal head at one end of the shank. The shank of the bolt is illustrated as extending through aligned holes in the plates 10 and 11. It is also illustrated as being of such length that the end thereof that is opposite the head projects beyond the outer surface of the plate 10. The last mentioned plate constitutes the work, and the nut, when mounted on the shank of the bolt and tightened, serves, in conjunction with the head of the bolt, to hold the plates 10 and 11 in clamped relation.

The nut under consideration is formed from the blank that is shown in Figure 4 and consists of a flat polygonal base or body 12, a cylindrical sleeve 13, and a side wall forming flange structure 14. The body 12 of the nut has a central circular aperture 15 and is illustrated as being hexagonal so far as its outer margin is concerned. The sleeve 13 is cylindrical and is joined to, and projects in one direction, from, the aperture defining portion of the body 12. It is formed by a drawing or extruding operation, as hereinafter described, and has a full length internal screw thread 16 corresponding in pitch and diameter to the external thread on the shank of the bolt 9. When the nut is mounted on the externally threaded shank of the bolt and properly turned the sleeve 13 feeds onto the shank and becomes interlocked therewith. The nut is adapted to be applied to the shank of the bolt in such manner that the sleeve 13 projects away from the work (see Figure 3.) The outer or free end of the sleeve has formed therein an annular series of laterally spaced longitudinally or axially extending notches 17. These notches are preferably spaced equidistantly and are of uniform width from the inner ends thereof to the outer ends. The portions of the outer end of the sleeve that are separated or spaced apart by the notches are bent or deflected inwards, as best shown in Figure 7, with the result that such portions are of less diameter than the inner end of the sleeve and hence grip with inward pressure the bolt or other externally threaded element to which the nut is applied. The nut, when applied to the bolt 9, as shown in Figure 3, turns or rotates freely in the direction of the plate 10 constituting the work until the inwardly bent outer or free end portions of the sleeve come into contact with the end of the shank of the bolt. As soon as the nut is turned so as to engage the aforementioned portions of the sleeve with the bolt shank such portions, due to the fact that they are inwardly bent, grip the shank of the bolt with inward spring pressure. The nut is preferably applied by way of a wrench or like tool so that ready turning thereof may be effected. As the nut is turned into engagement or clamped relation with the work the outer end portions of the sleeve are urged outwards out of their normal inwardly bent position and the spring action which results causes such portions so to grip the shank of the bolt with inward pressure that the nut tends to remain in place. Because of the inherent resiliency of the outer free end portions of the sleeve 13 the nut may only be released from its operative position by applying a comparatively heavy reverse rotative force through the medium of a wrench or like tool. The notches 17 are preferably six in number and are of such width that the outer or free end portions of the sleeve may be bent inwards to an appreciable extent.

The flange structure 14 consists of flanges 18 and these correspond in number to, and are associated respectively with, the outer marginal portions of the polygonal body 12. As best shown in Figures 1 and 2, the flanges 18 are joined to said marginal portions by right angle bends and extend in the same direction as the internally threaded substantially cylindrical sleeve 13. They surround and are spaced outwards of the sleeve and constitute a polygonal side wall whereby the nut may be gripped by a wrench or similar tool in connection with turning thereof. The ends of the flanges 18 constituting the flange structure 14 abut against one another and hence the flange structure as a whole is rigid and continuous in character. The flanges are the same in height and are so proportioned that the outer or free edges thereof are in a single plane and are substantially coplanar with the outer or free end edge of the sleeve 13. Preferably each flange 18 is truly parallel to the flange that is diametrically opposite it, and the notches 17 are positioned directly opposite the abutting edges of the flanges. The blank from which the nut is formed is stamped from flat thin spring steel stock and, as shown in Figure 4, comprises an intermediate hexagonal body-forming portion 12$^a$, an inner centrally apertured sleeve forming portion 13$^a$ and outer flange forming portions 18$^a$. After formation or stamping the blank is subjected to the action of a pair of coacting dies in order to extrude or draw the inner portion 13$^a$ and form the cylindrical sleeve 13. It is contemplated that the dies will simultaneously with the drawing of the inner portion 13$^a$ to form the sleeve 13 bend the outer flange portions 18$^a$ so as to form the flanges 18 constituting the flange structure 14. The notches 17 are preferably formed at the time the blank is stamped. After the blank is subjected to the action of the dies the nut is in the form shown in Figure 5. At the completion of the die action the intermediate portion 12$^a$ of the blank forms the centrally apertured polygonal body 12. Following shaping of the blank the inner periphery of the sleeve 13 is tapped, as shown in Figure 6, to form the internal screw thread 16 corresponding in pitch and diameter to the external thread of the shank of the bolt. Thereafter the portions of the outer or free ends of the sleeve that are between the notches 17 are bent or deflected inwards, as shown in Figure 6. Inward bending of such portions of the outer end of the sleeve is preferably effected by a crimping or wedging die.

The improved method consists of the steps or operations heretofore described and is characterized by the fact that it may be carried out expeditiously and at a low cost.

The invention is not to be understood as restricted to the precise details set forth, since these may be modified within the scope of the appended claim, without departing from the spirit and scope of the invention.

The present application is a division of an application for United States Letters Patent filed by me on August 12, 1942, Serial No. 454,525.

Having thus described the invention what I claim as new and desire to secure by Letters Patent is:

That improvement in the manufacture of a self-locking nut which comprises first stamping from comparatively thin spring metal stock a flat blank consisting of an intermediate body forming portion, an inner centrally apertured sleeve forming portion with notches leading radially outwards from the aperture and terminating adjacent the midpoint of said inner portion, and an outer flange forming portion, then deforming the blank by extruding the inner portion thereof in one direction to form a central substantially cylindrical sleeve of greater height than the length of the notches and upsetting the outer portion in the same direction to form a substantially continuous flange structure around and in spaced relation with the sleeve, then tapping the inner periphery of the sleeve from end to end to form an internal screw thread for interfitting with an externally threaded element, and finally completing the nut by bending inwards the portions of the outer or free end of the sleeve that are between the notches in order to cause them to grip with inward pressure the externally threaded element when the sleeve is mounted thereon.

ARTHUR H. THOMPSON.